UNITED STATES PATENT OFFICE.

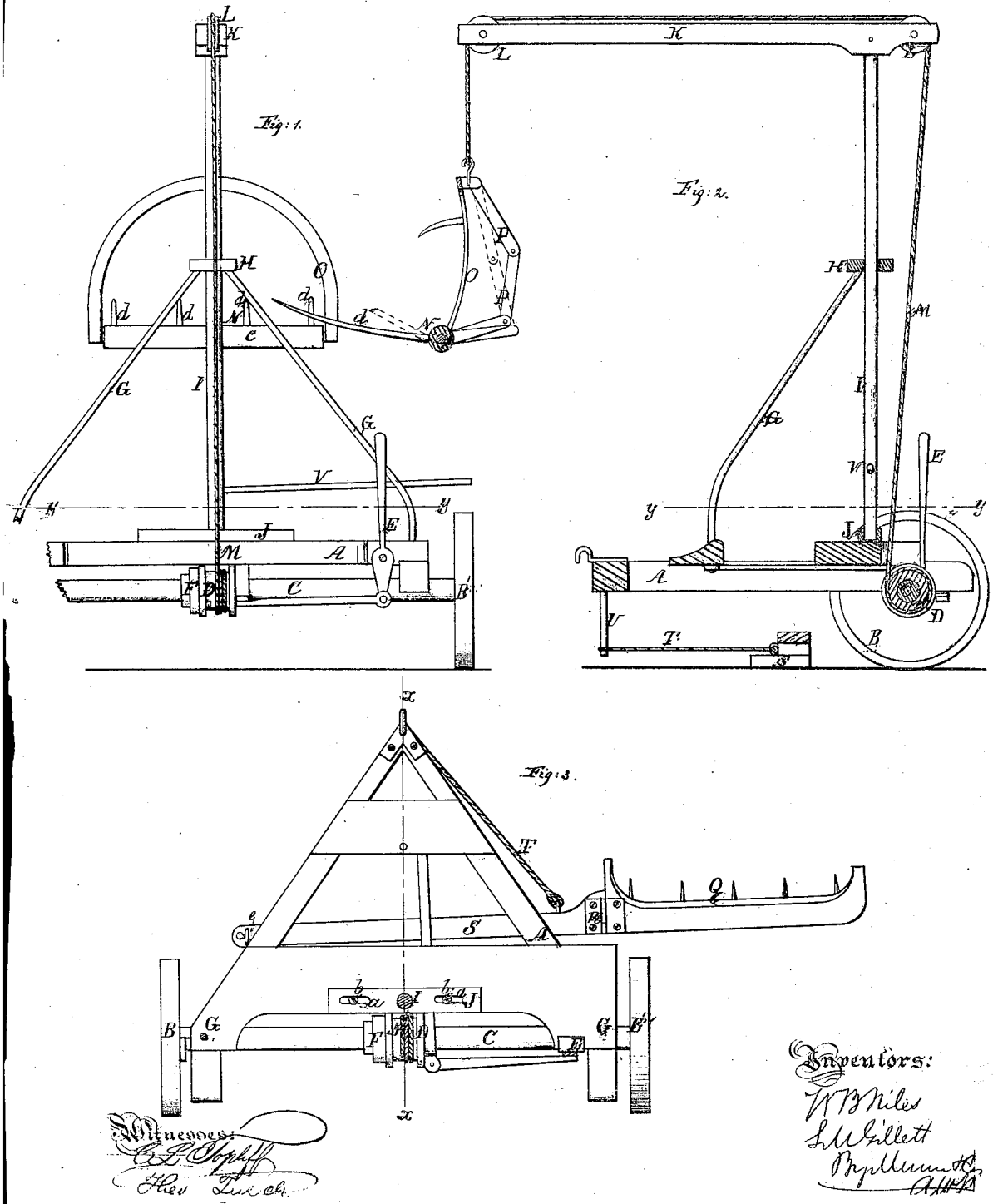

W. B. NILES AND S. M. GILLETT, OF LITTLE YORK, NEW YORK.

IMPROVEMENT IN LOADING ATTACHMENTS TO HAY-WAGONS.

Specification forming part of Letters Patent No. 52,190, dated January 23, 1866.

*To all whom it may concern:*

Be it known that we, WILLIAM B. NILES and SYLVANUS M. GILLETT, of Little York, in the county of Cortland and State of New York, have invented a new and Improved Hay-Loading Device; and we do hereby declare that the following is a full, clear, and exact description thereof, which will enable those skilled in the art to make and use the same, reference being had to the accompanying drawings, forming part of this specification, in which—

Figure 1 is a rear elevation of our invention; Fig. 2, a side sectional view of the same, taken in the line $x\,x$, Fig. 3; Fig. 3, a horizontal section of the same, taken in the line $y\,y$, Figs. 1 and 2.

Similar letters of reference indicate corresponding parts.

This invention relates to a new and improved machine for loading hay upon a wagon direct from the field, the latter having a crane upon it provided with a fork and tackle, the latter being connected with the axle of the wheels in such a manner that the loaded fork may be raised automatically and readily made to tilt, so that it may discharge its load.

A represents a frame, which is of triangular form, and is mounted on two wheels, B B', at its rear part. One of these wheels, B, is placed loosely on the axle C. The other wheel, B, is keyed permanently to the axle.

On the axle C there is placed a loose pulley, D, which, by means of a lever, E, may be pressed against a shoulder, F, on the axle, so as to produce sufficient friction to cause said pulley to rotate with the axle whenever desired.

On the frame A there are secured three inclined bars, G, whcih support a circular cap-plate, H, through which the upright I of a crane passes, the lower end of said upright being stepped in a movable or adjustable block, J, on the frame A. This block J has oblong slots $a$ made in it, through which screws $b$ pass into the frame, (see Fig. 3,) and the upper end of the upright I has a horizontal arm, K, secured to it, in which two pulleys, L L, are placed, one near each end.

M is a rope or chain, one end of which is attached to the pulley D. This rope or chain passes over the pulleys L L, and has a fork, N, attached to it.

The fork N is constructed of a head, $c$, which is fitted in a bail, O, so that it may turn therein. The head $c$ has tines $d$ attached to it of the usual or any proper form, and the head $c$ is connected with the upper part of the bail O by jointed arms P, as shown clearly in Fig. 2.

Q is a rake, which is connected by a joint, R, to a bar, S, which is attached by a joint, $e$, to the side of the frame A. The bar S is stayed by a rope or chain, T, from a pendent rod, U, at the front end of the frame A.

The upright I has a lever, V, attached to it, for the convenience of turning it.

The frame A is connected to the rear axle of a wagon, and as the latter is drawn along the rake Q takes up the hay from the windrow, and whenever a fork-load is gathered the latter is inserted in the hay, the pulley D pressed against the shoulder F, and the chain or rope M wound upon said pulley, and the fork with its load elevated and turned over the wagon by turning the upright I through the medium of the lever V. The loaded fork is allowed to descend upon the wagon by easing the pressure of the pulley D against the shoulder F, and by pulling outward the jointed arms P the tines are allowed to drop or be depressed, so that they may discharge their load.

In loading from cocks the rake Q may be detached from the frame A, if desired.

The device as a whole is extremely simple and efficient, and when passing over inclined ground the upright I, in consequence of the step J being adjustable, may always be kept in a vertical or upright position.

The machine may be operated or managed with but little labor and by any one of ordinary ability.

Having thus described our invention, we claim as new and desire to secure by Letters Patent—

The crane placed on a mounted frame, A, and arranged with an adjustable step, so that it may be kept in a vertical position, in combination with a fork, N, and rope or chain M, arranged with the crane and attached to a pulley, D, on the axle C, to operate in the manner substantially as and for the purpose set forth.

WM. B. NILES.
SYLVANUS M. GILLETT.

Witnesses:
G. W. NEWELL,
RICHARD WILLIAMSON.